(No Model.)
F. W. TOAN.
COMBINED HAMES AND NECK YOKE.
No. 564,236. Patented July 21, 1896.
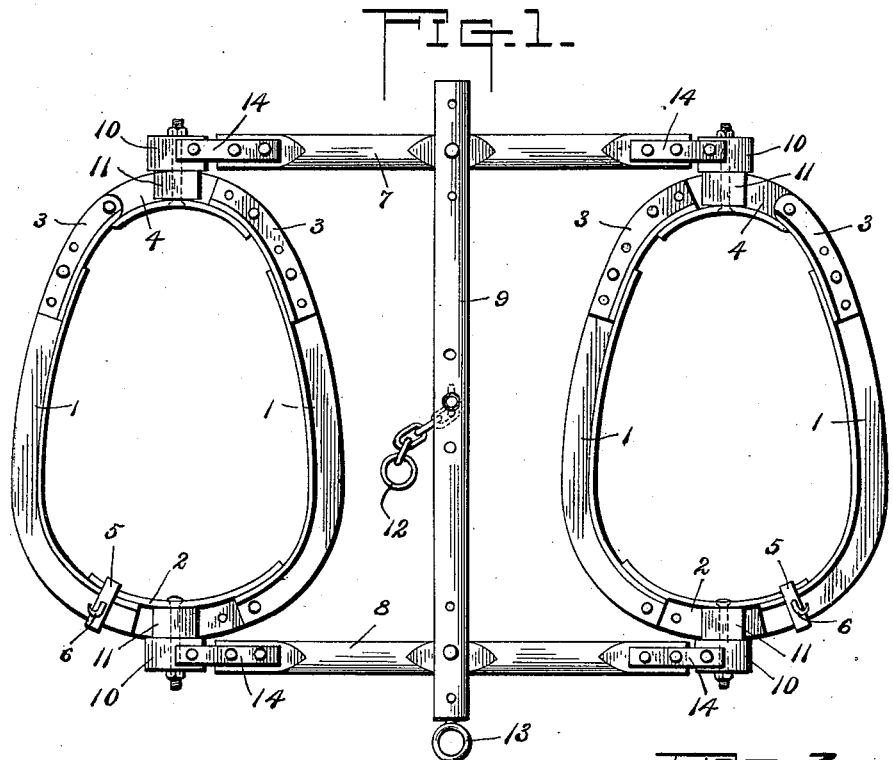
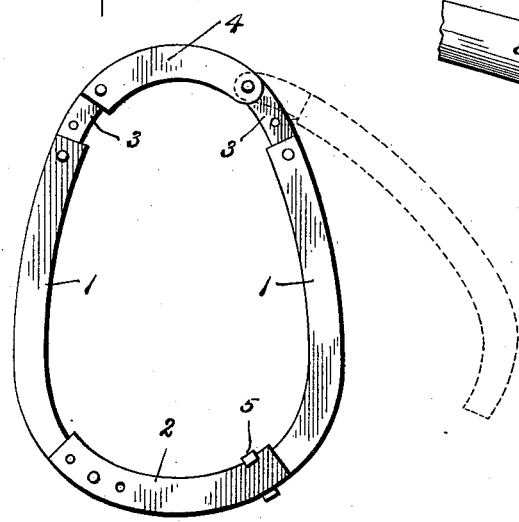
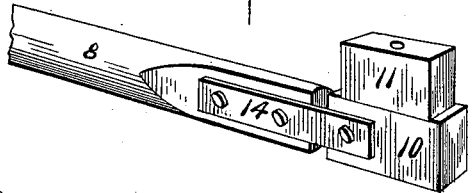
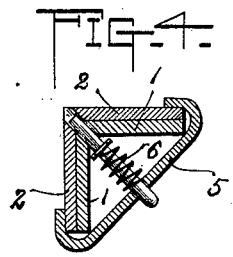
Witnesses
A. M. Poynton.
V. B. Hillyard.
Inventor
Fred W. Toan,
By his Attorneys,
C. A. Snow & Co.

UNITED STATES PATENT OFFICE.

FRED WEST TOAN, OF PORTAGE, OHIO.

COMBINED HAME AND NECK-YOKE.

SPECIFICATION forming part of Letters Patent No. 564,236, dated July 21, 1896.

Application filed March 17, 1896. Serial No. 583,570. (No model.)

*To all whom it may concern:*

Be it known that I, FRED WEST TOAN, a citizen of the United States, residing at Portage, in the county of Wood and State of Ohio, have invented a new and useful Combined Hame and Neck-Yoke, of which the following is a specification.

This invention aims to provide an improved hame and neck-yoke for hitching a team for plowing, logging, dragging, and working among trees and which are susceptible of use for general purposes.

By this invention the amount of harness usually required for hitching a team can be reduced considerably, and where a pole or tongue is resorted to for applying the draft to the vehicle or part to be moved traces and their adjuncts can be dispensed with, the draft being applied directly to the pole or tongue by the connections uniting the hames.

The invention is constructed to allow a freedom of movement of the animals without galling or chafing them, so that one animal can walk upon an elevation or in a depression or step in advance of or fall behind the other without causing inconvenience or injury to either.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a front elevation of the improved hame and neck-yoke combined. Fig. 2 is a detail view of one of the hames, showing a side open by dotted lines. Fig. 3 is a detail view showing the joint formed between the hames and the connecting-bars. Fig. 4 is a detail view in section of the meeting ends of the hames, showing the catch for securing them.

Corresponding and like parts are referred to in the following description and designated in the accompanying drawings by the same reference-characters.

The hames are similarly constructed, either of tubular or angle metal, and comprise sections which are secured together so as to admit of their size being varied to adapt them to different-sized animals. Each of the hames is formed of side pieces 1, a lower section 2, upper extension-pieces 3, and an upper section 4, these parts being connected by fastenings in any suitable way so as to admit of their adjustment to enlarge or contract the hames, as required. One of the side pieces is hinged at its upper end to the section 4, and its lower end is held when closed to the lower section 2 by a catch of suitable formation, thereby admitting of the hames being placed in position upon the collar or removed therefrom, as desired. The lower end of the pivoted side piece overlaps the adjacent end of the lower section 2, and a slide 5, fitted to the section 2 so as to move thereon, is provided with a spring-actuated locking-pin 6, which secures the parts when brought together.

The neck-yoke attachment comprises an upper bar 7, a lower bar 8, and a vertical bar 9, the latter being pivotally and adjustably connected at its ends with the bars 7 and 8 at points intermediate of their length, thereby admitting of the bars 7 and 8 being brought closer together or separated according to the size to which the hames are adjusted.

The bars 7 and 8 extend in parallel relation and are connected with the upper and lower portions of the hames in such a manner as to admit of the hames rising and falling and moving forward and backward, according to the relative position of the animals without chafing or inflicting pain upon the latter. A pair of blocks 10 and 11 are pivotally connected together and are interposed between the hames and the adjacent end of the horizontal bar, it being understood that a pair of these blocks will be had for the terminal of each of the bars 7 and 8. The blocks 10 have pivotal connection with the extremities of the horizontal bars, and the blocks 11 have a secure connection with the respective upper and lower sections of the hames. Hence it will be seen that the hames can rise and fall and move forward and backward without binding or in the least inconveniencing the animals. A draft-ring 12 has adjustable connection with the vertical bar 9, and a ring 13 at the lower end of the bar 9 is adapted to receive the pole or tongue of the vehicle or other appliance to be moved. The several bars 7, 8, and 9 may be either metal or wood, or a combination of the two, as preferred, and when made of wood the end portions of the horizontal bars will be reinforced by metal plates 14, to which the blocks 10 are pivotally connected.

After the hames and the neck-yoke attachment have been properly adjusted to the team there will be no need for disarranging or disconnecting the parts, because when hitching and unhitching the team all that is required is to swing outward or open the pivoted side sections of the hames, as previously intimated and as will be readily comprehended.

Having thus described the invention, what is claimed as new is—

1. The combination with a set of hames, of blocks having pivotal connection with the upper and lower ends of the hames and capable of turning about a vertical axis, and upper and lower bars having pivotal connection with the aforesaid blocks and adapted to turn about a horizontal axis, substantially as described.

2. The combination with a set of hames, of upper and lower bars having vertical and horizontal pivotal connection with the upper and lower ends of the hames, a vertical bar having pivotal and adjustable connection with the upper and lower bars, and a draft-ring having adjustable connection with the vertical bar, the parts being disposed to operate substantially in the manner and for purpose specified.

3. In a pair of hames having a side piece pivoted at one end and having the free end of the pivoted side piece constructed to overlap the meeting portion of the hames, the combination of a slide having its end portions constructed to embrace the overlapping ends of the hame-sections, and a spring-actuated locking-pin carried by the slide and adapted to pass through registering openings in the aforesaid overlapping ends, substantially as and for the purpose set forth.

In testimony that I claim the foregoing as my own I have hereto affixed my signature in the presence of two witnesses.

FRED WEST TOAN.

Witnesses:
LE ROY J. KIMBERLIN,
BYRON E. TOAN.